(12) United States Patent
Park (10) Patent No.: US 6,467,645 B2
(45) Date of Patent: Oct. 22, 2002

(54) COOKING CONTAINER AND MANUFACTURING METHOD THEREFOR

(76) Inventor: Jong-Do Peter Park, 1630 Summit Ridge Dr., Diamond Bar, CA (US) 91765-4335

( * ) Notice: Subject to any disclaimer, the term of this patent is extended or adjusted under 35 U.S.C. 154(b) by 0 days.

(21) Appl. No.: 09/912,641

(22) Filed: Jul. 24, 2001

(65) Prior Publication Data

US 2001/0042753 A1 Nov. 22, 2001

Related U.S. Application Data

(63) Continuation-in-part of application No. 09/449,156, filed on Nov. 24, 1999.
(60) Provisional application No. 60/119,492, filed on Feb. 10, 1999, and provisional application No. 60/116,149, filed on Jan. 16, 1999.

(51) Int. Cl.[7] .................................................. A47J 39/00
(52) U.S. Cl. ................................. 220/592.28; 220/573.1
(58) Field of Search .......................... 220/573.1, 573.2, 220/592.28

(56) References Cited

U.S. PATENT DOCUMENTS

| | | |
|---|---|---|
| 1,093,648 A | 4/1914 | Potter |
| 2,279,000 A | 4/1942 | Larson |
| 2,573,524 A | 10/1951 | Weisburg et al. |
| 2,969,452 A | 1/1961 | Geller et al. |
| 3,425,381 A | 2/1969 | Wessely |
| 3,603,767 A | 9/1971 | Scicchitano |
| 3,724,711 A | 4/1973 | George et al. |
| 3,736,893 A | 6/1973 | Coppens et al. |
| 3,745,290 A | 7/1973 | Harnden, Jr. et al. |
| 3,934,748 A | 1/1976 | Racz |
| 4,026,274 A | 5/1977 | Gutierrez |
| 4,063,068 A | 12/1977 | Johnson et al. |
| 4,138,606 A | 2/1979 | Brown |
| 4,595,120 A | 6/1986 | Logan et al. |
| 4,629,866 A | 12/1986 | Proctor |
| 4,667,085 A | 5/1987 | Remmel et al. |
| 4,705,184 A | 11/1987 | Tsukamura |
| 4,847,459 A | 7/1989 | Desai |
| 4,971,215 A | 11/1990 | Santoni |
| 5,012,947 A | 5/1991 | Roland |
| 5,125,393 A | 6/1992 | Levitin |
| 5,143,504 A | 9/1992 | Braakman |
| 5,228,384 A | 7/1993 | Kolosowski |
| 5,439,165 A | * 8/1995 | Cartossi .................... 220/573.1 |
| 5,441,169 A | 8/1995 | Petty |
| 5,487,329 A | * 1/1996 | Fissler ..................... 220/573.1 |
| 5,507,220 A | 4/1996 | Jung |
| 5,579,946 A | 12/1996 | Rowan et al. |
| 5,644,976 A | 7/1997 | Muchin et al. |
| 5,716,537 A | 2/1998 | Talge, III et al. |

* cited by examiner

Primary Examiner—Stephen P. Garbe
Assistant Examiner—Joseph C. Merek
(74) Attorney, Agent, or Firm—Lee & Hong

(57) ABSTRACT

A cooking container has an outer shell, an inner shell disposed inside the outer shell forming a cylindrical wall space between the outer and inner shells. The wall space is formed between the outer and inner shells stantially along the height of the inner shell by curling the flanges of the inner and the outer shells at least four times. The cooking container also has a first heat conductive plate being in contact with an inner bottom surface of the outer shell and an outer bottom surface of the inner shell to allow even distribution of heat through out the bottom surface of the inner shell. A'second heat conduction plate is affixed to and in contact with an outer bottom surface of the outer shell. The wall space between the outer and inner shells contains ambient air.

18 Claims, 9 Drawing Sheets

COOKING CONTAINER AND MANUFACTURING METHOD THEREFOR

CROSS REFERENCE TO RELATED ART

This is a continuation-in-part of application Ser. No. 09/449,156, filed Nov. 24, 1999, which is hereby incorporated by reference in its entirety, and which claims the benefit of U.S. Provisional Patent Application Nos. 60/116,149 filed on Jan. 16, 1999 and 60/119,492, filed on Feb. 10, 1999.

BACKGROUND OF THE INVENTION

1. Field of the Invention

The present invention relates to a cooking utensil, and particularly, to a cooking utensil having a double-layered wall structure which preserves heat entrapped during cooking.

2. Description of the Related Art

Various types of cooking utensil are known and used in a kitchen. Such cooking utensil is made of one or more layers of stainless steel and has a single-layered bottom. The single-layered bottom is good for directly transmitting heat to the food contained in the utensil, but also causes burning of the food when carefully not attended to.

To solve the above problems, a cooking utensil having a double-layered structure has been proposed for preventing burnt food and to improve food flavor. One of such ideas is:

published in Korean Utility Laid-Open Publication No. 85-7307 which teaches that paraffin is injected between a space provided by a double-layered structure and an air-hole is established thereon.

Moreover, a pot of a double-layered structure and a pot having a double-layered structure into which a working fluid is injected are taught by Japanese Laid-Open Publication No. 56-169825.

Instead of charging the space with paraffin, a structure into which a fluid of heat-medium is injected and sealed is disclosed in Korean Laid-Open Publication No. 97-4035.

In such pots having the above-mentioned structures of the related arts, the gaps between the double-layered structure are filled with heat media to provide even-heat distribution and to save heat energy. Unfortunately, the structures of the related arts are filled with the heat medium substances and have to be sealed to prevent the substances from leaking out, resulting in the difficulties in manufacturing the cookware.

SUMMARY OF THE INVENTION

Accordingly, the present invention is directed to a cooking utensil that substantially obviates one or more of the problems due to limitations and disadvantages of the related art.

The object of the present invention is to provide a cooking utensil having a double-layered structure which provide even heat distribution and preserves heat for a longer period of time.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cooking utensil comprises an outer shell having an opening and a first flange; an inner shell having a second flange and being disposed inside the outer shell through the opening, forming a wall space between the outer and inner shells, wherein the wall space is formed substantially along the height of the inner shell and at least partially contains air; and a first heat conductive plate being in contact with both an inner bottom surface of the outer shell and an outer bottom surface of the inner shell to allow even distribution of heat through out the bottom surface of the inner shell, wherein the first and the second flanges of the outer and inner shells are curled at about 360 degree angle and at least four times to form a rolled joint to hermetically seal the wall space.

According to one aspect of the present invention, the wall space between the outer and inner shells contains ambient air. Alternatively, the wall space defined by the outer and inner shells contains a heat conduction medium, such as silicon oil.

According to another aspect of the present invention, a second heat conduction plate is affixed to and in contact with an outer bottom surface of the outer shell. In addition, a support cover is configured to fit in surrounding relation to the second heat conduction plate. An inner lid that fits over a flange of the inner shell covers an opening defined by the inner shell. The inner lid comprises a disk having a diameter sufficiently large to cover the opening of the inner shell; and a ring coupled to the disk and circumferentially covering outer edges of the disk. The disk is made of one selected from the group of tempered glass, stainless steel, aluminum and aluminum alloy. A cover that fits over a flange of the inner shell and the lid substantially covers an opening defined by the inner shell. The cover and the lid define an air gap space therebetween for trapping heat.

When heat conducting medium, such as silicon oil is contained in the wall space defined by vertical cylindrical walls of the outer and inner shells, the amount of silicon oil stored in the wall space is approximately 55 to 75%, and more preferably about 65%, by volume.

According to another aspect of the present invention, the cooking utensil further comprises a guard ring disposed in a lower proximity of the wall space around a circumference of the first heat conduction plate. Preferably, the guard ring has an L-shaped cross section. Alternatively, the guard ring has a U-shaped cross section.

According to another embodiment of the present invention, a cooking utensil comprises an outer shell having an opening and a first flange; an inner shell having a second flange and being disposed inside the outer shell through the opening, forming a wall space between the outer and inner shells, wherein the wall space is formed substantially along the height of the inner shell and at least partially contains air, wherein an inner bottom surface of the outer shell and an outer bottom surface of the inner shell are affixed to each other to allow even distribution of heat through out the bottom surface of the inner shell; and a heat conduction plate affixed to and in contact with an outer bottom surface of the outer shell, wherein the first and the second flanges of the outer and inner shells are curled at least four times to form a rolled joint to hermetically seal the wall space.

A method of manufacturing a cooking utensil having outer and inner shells forming wall and bottom spaces between the outer and inner shells comprises the steps of placing upright the outer shell on a concaved mold, the outer shell having a flange; placing a predetermined amount of the heat conductive medium into a space defined by the outer shell placed on the first mold; placing upright the inner shell in the outer shell so that the heat conductive medium at least partially surrounds the inner shell, the inner shell having a flange placed substantially parallel to the flange of the outer shell, wherein a convexed mold is placed in the inner shell to firmly hold the inner shell with respect to the outer shell; forming a rolled joint by curling together the flanges of the outer and inner shells at least four times to prevent the heat conductive medium from being discharged from the space even when the cooking utensil is exposed to heat, wherein the curling of the flanges of the outer and inner shells is carried out by placing at least one curling roller against the flanges while rotating the outer and inner shells with respect to the curling roller;

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
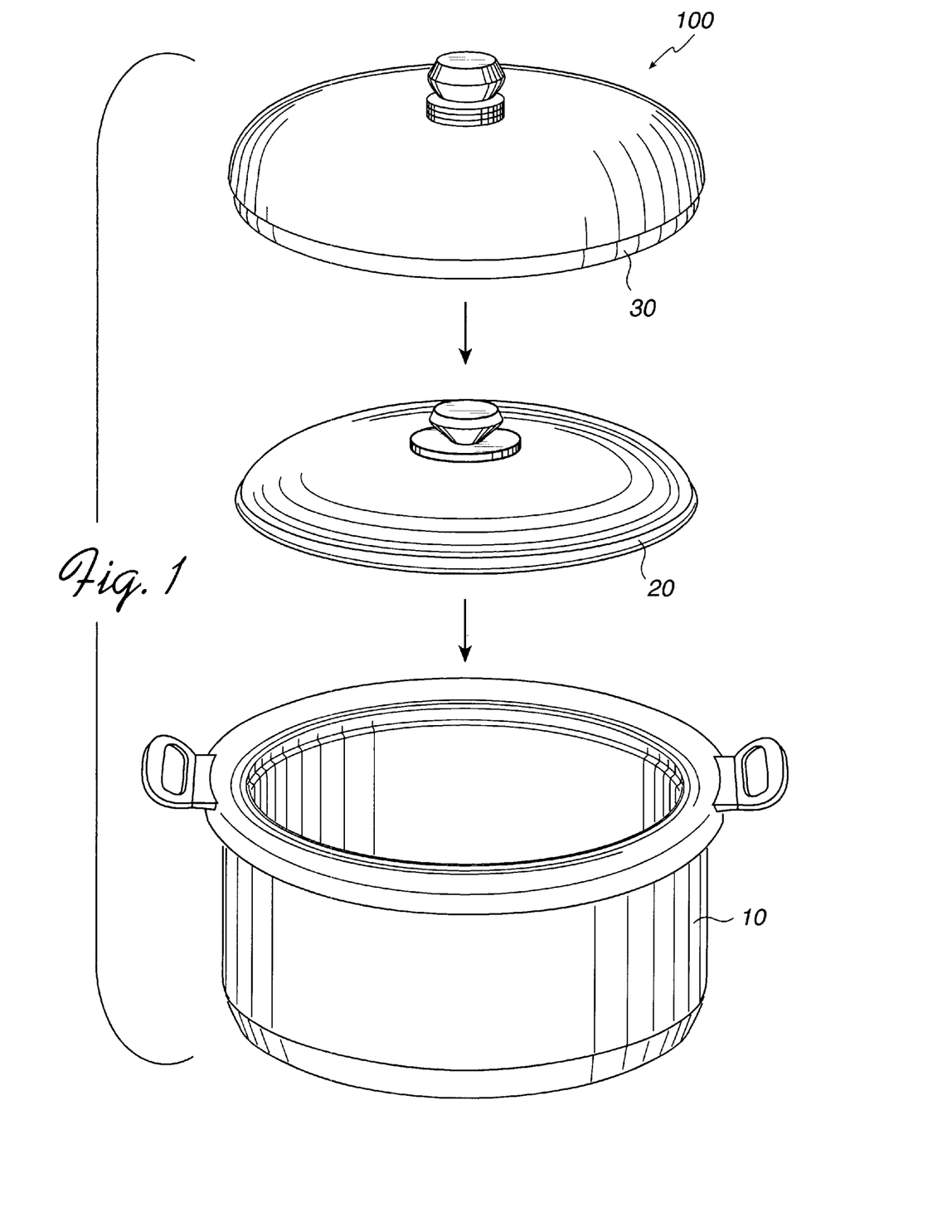
FIG. 1 is a perspective view of the cooking utensil according to the present invention.

FIG. 1 is a perspective view of the cooking utensil 100 according to a preferred embodiment of the present invention. The cooking utensil 100 generally comprises a cooking container 10 for receiving and cooking food contained therein, an inner lid 20 for substantially covering the container 10 and a thermal insulating cover 30 disposed above the inner lid 20 and covering the opening of the container 10.

Figure 2:
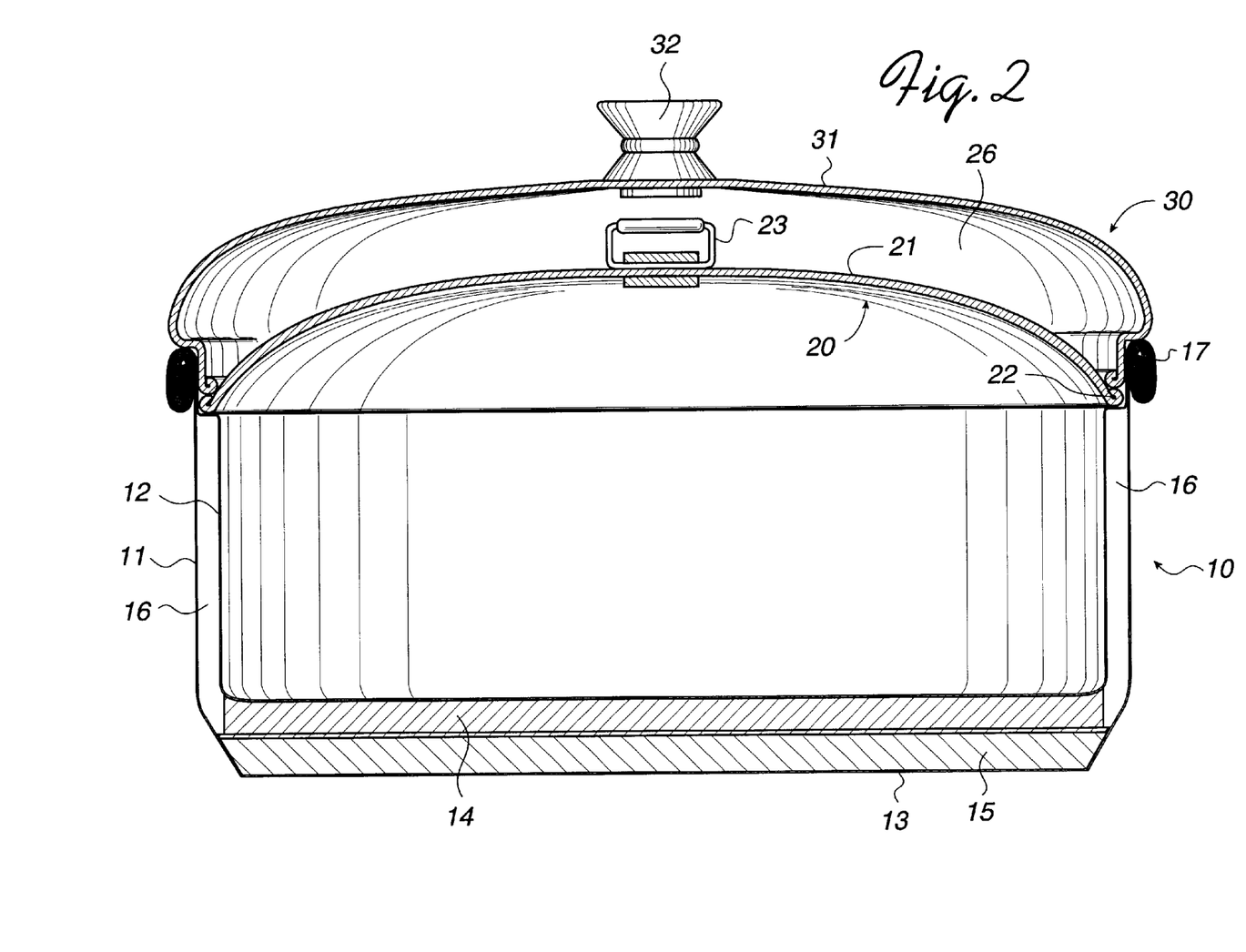
FIG. 2 is a cross-sectional view of a first embodiment of cooking utensil according to the present invention.

FIG. 2 is a cross-sectional view of the cooking utensil 100 having at least a double-layered structure according to the present invention. According to the preferred embodiment, the inner lid 20 is constructed with a dome-shaped disk 21 of which edge is surrounded by a safety ring 22 preferably made of stainless steel or other suitable materials. The safety ring 22 is attached to the edges of the disk 21, thereby preventing damages to the disk 21. However, the inner lid 20 may be used without the ring 22. Preferably, the disk 21 is made to form a slight convexed surface with respect to the container 10 of the cookware.

The disk 21 of the inner lid 20 is preferably made of tempered glass of approximately 4 mm thick. Alternatively, the disk 21 may be made of stainless steel, aluminum, aluminum alloy or other suitable materials known to one of ordinary skill in the art.

A handle 23 is attached to the center of the dome-shaped disk 21 by, for example, piercing the central portion of the disk 21. Alternatively, the handle 23 may be affixed to the disk 21 by using adhesives or other fasteners.

The thermal insulating cover 30 is preferably made of a stainless steel plate 31 being about 0.5 to 0.7 mm thick, and preferably about 0.6 mm thick, and has a dome like figure. The insulating cover 30 and the inner lid 20 form a horizontal air gap 26 which acts as an insulating layer to trap and hold heated air therein. As a result, once the heat source is removed from underneath the cooking utensil 100, the air gap 26 and the vertical space 16 filled with ambient air insulate the inner shell 12 from outside and reduce heat loss, thus keeping the food contained in the inner shell 12 warmer for a longer period of time. More importantly, the structure of the present invention allows the food to be cooked even after removing heat from the cooking utensil. Alternative to a single sheet structure, the cover 30 may comprise a plurality of layers of stainless steel and/or aluminum for increased durability and preservation of heat. In the thermal insulating cover 30, a knob 32 is attached to the center of the thermal insulating cover 30. In the present invention, the knob 32 may include a built-in temperature gauge for measuring the inside temperture of the cookware. The temperature gauge provides the user to remove the cooking utensil 100 from the heat source once a desired temperature has been reached.

The container 10 of the cooking utensil 100 according to the present invention includes an outer shell 11 and an inner shell 12 disposed adjacent the outer shell. Edges or flanges of the outer and inner shells 11 and 12 are preferably curled together to form a rolled joint 17.

As a result, a vertical space 16 filled with an air pocket is provided between the outer and inner shells 11 and 12. The air pockets are sealed and are not in fluid communication with outside air. The vertical space 16 filled with air is preferably filled with ambient air during the manufacturing process. In the preferred embodiment, the distance between the outer and inner shells 11 and 12 are approximately 15 to 25 mm, and preferably about 20 mm. Preferably, the outer and inner shells 11 and 12 are made of such materials as AISI304 stainless steel that has a thickness of about 0.6 mm. Alternatively, instead of using a single-layered stainless steel, a multiple-layered composite materials may be used. Typically, three or more layered stainless steel or combination of stainless copper and steel are preferred.

In the preferred embodiment of the present invention, upper flanges of both the outer and inner shells 11 and 12 are jointly curled or rolled about 4 to 8 times, and preferably at least 4 times, to form the rolled joint 17. In particular, the rolled joint 17 is formed by curling the flanges of the outer and the inner shells 11 and 12 about the same axis for at least 4 times, each rotation being about 360 degrees so that there are at least 16 shell layers. The tightly rolled joint 17 prevents the air contained in the vertical space 16 from escaping even when the cooking utensil 100 is subjected to intense heat. The unique structure of the rolled joint 17 and the thickness of the walls of the outer and inner shells 11 and 12 allow the cooking untensil 100 to be used without any air escape valves built into the wall of the container 10 to prevent the utensil against possible explosion.

Referring to FIG. 2, there is provided a first heat conduction plate 14 placed between the outer and inner shells 11 and 12. The first heat conduction plate 14 is preferably made of an aluminum disk, copper or other suitable materials known to one of ordinary skill in the art. The first heat conduction plate 14 is preferably flushly affixed to the bottom of the outer shell 11. The first heat conduction plate 14 is about 1.5 to 2.5 mm thick, and preferably about 2 mm thick. To provide speedy transmission of heat to the food contained in the cooking container 10, the first heat conduction plate 14 also abuts against the bottom of the inner shell 12. Due to the presence of the first conduction plate 14, there is no space or air gap 16 between the bottom of the inner shell 12 and that of the outer shell 11.

In the preferred embodiment, a second heat conduction plate 15 is disposed below the bottom surface of the outer shell 1 1 preferably below the first heat conduction plate 14. Similar to the first heat conduction plate, the second heat conduction plate 15 is preferably made of an aluminum disk or other suitable materials known to one of ordinary skill in the art. The second heat conduction plate 15 is about 2 to 4 mm thick, and preferably about 3 mm thick. The second heat conduction plate 15 is securely affixed to the bottom of the outer shell 11 by brazing or other suitable method known to one of ordinary skill in the art.

The second heat conduction plate 15 is covered by a support cover 13. The support cover 13 is attached to an outer bottom surface of the outer shell 11 fully surrounding and in contact with the second heat conduction plate 15. The support cover 13 is preferably made of the same material as that of the container 10 of the cooking utensil 100. In particular, the support cover 13 is made of AISI304 stainless steel that has a thickness of about 0.5 mm. In the container, the first heat conduction plate 4, the bottom wall of the outer shell 11, the second heat conduction plate 15 and the support cover 13 are in thermal communication with each other.

Figure 3:
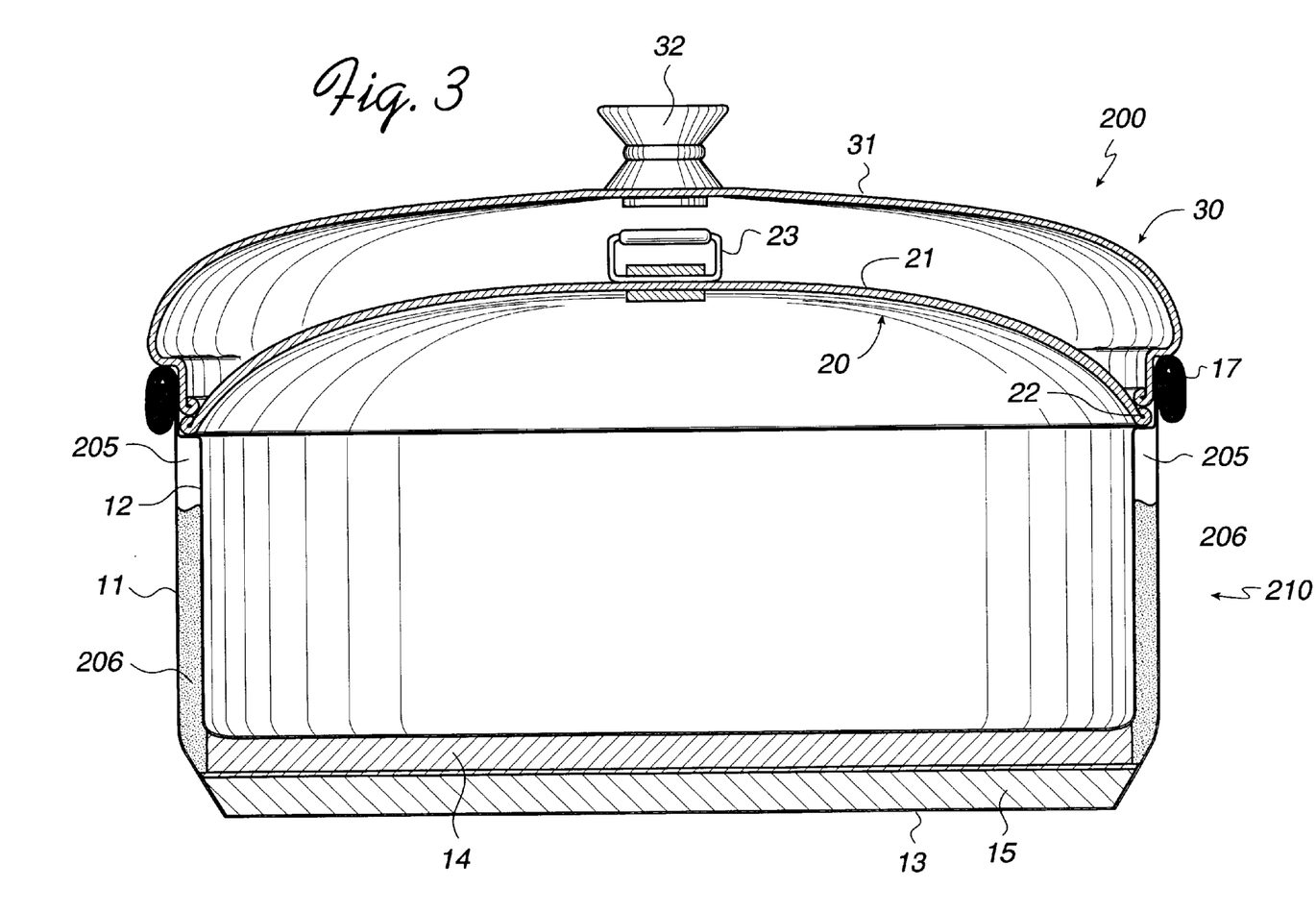
FIG. 3 is a cross-sectional view of a second embodiment of cooking utensil according to the present invention.

FIG. 3 illustrates a second embodiment of the present invention. The cooking utensil 200 according to the second embodiment is substantially the same as that of the first embodiment except that the vertical space 205 formed betweeen the outer and inner shells 11 and 12 are at least partially filled with a heat conduction medium 206, such as silicon oil or other suitable materials known to one of ordinary skill in the art.

In the cooking utensil 200, the vertical space 205 is partially filled with silicon oil up to about 55 to 90% by volume. Preferably, the silicon oil is filled up to about 65% of the vertical space 205 to accommodate for increased pressure in the vertical space 205. For example, while cooking, the pressure of the vertical space 205 varies from 200 mmAG to 600 mmAG due to expansion of the silicon oil.

The operation of the preferred embodiment of the present invention is described in accordance with the first embodiment of the present invention for a purpose of illustration. The operation of the second embodiment is identical to the first embodiment, and therefore, will not be repeated for the sake of brevity.

Once the bottom of the cooking utensil 100 is in contact with a heat source, the contents contained in the inner shell 12 is heated by the heat transmitted through the support cover 13, second heat conduction plate 15, outer shell 11, first heat conduction plate 14 and finally the inner shell 12, successively.

Because the heat source generally provides for uneven distribution of heat to a bottom surface, the bottom of the cooking utensil 100 is unevenly heated. However, due to the presensence of the support cover 13, second heat conduction plate 15 and first heat conduction plate 14, the heat from the heat source is more evenly distributed to the bottom of the inner shell 12 allowing even distribution of heat to the food contained therein.

The first and second conduction plates 14 and 15 also serve to heat the vertical cylindrical walls of the cooking utensil 100. Although the most of the heat transmitted to the bottom of the outer shell 11 is conducted to the first heat conduction plate 14, the rest of the heat from the first and second conduction plates 14 and 15 are transferred to the side walls of the outer and inner shells 11 and 12, respectively. Then, the temperature of the air in the space 16 is gradually increased and the heat energy of the air is transmitted to the inner shell 12 and spread out throughout the entire wall of the inner shell 12. Therefore, the temperature along the inner shell 12 is substantially constant at any region thereof. In other words, the temperature of the bottom of the inner shell 12 is about the same as that of the cylindrical wall.

The presence of air in the vertical space 16 delays heat transfer between the sides of the outer and inner shells 11 and 12 as well as provides even heat distribution as the heat conducted through the outer shell 11 of the cooking utensil 100 primarily is not transferred to the inner shell 12 of the pot but is partially conveyed through the air.

The heat distributed uniformly in the inner shell 12 heats up the contents in the cooking utensil 100. Once heated, the double-layered structure of the cooking utensil 100 according to the present invention maintains the trapped heat, even after the heat source is removed, for a prolonged period. The heat loss through the sidewalls of the inner and outer shells 11 and 12 are slowed due to the presence of the air pockets 6.

Moreover, it is easy to preserve the heat inside the cooking utensil 100 as the lid 20 and the thermal insulating cover 30 stop the heat dissipating upward. The third air-pocket 26 formed between the lid 20 and the insulating cover 30 traps heat therein and holds the temperature for an extended period of time.

Accordingly, the present invention prevents the food from being burnt or being partially heated, since the flame of heating source is not directed to the inner shell 12 and heat is not focused in any one region. In addition, the air stored in the vertical cylindrical space 16 acts as an insulator. Therefore, the food stays hotter for a longer period of time. Moreover, heat efficiency of the cooking utensil is improved.

Figure 4:
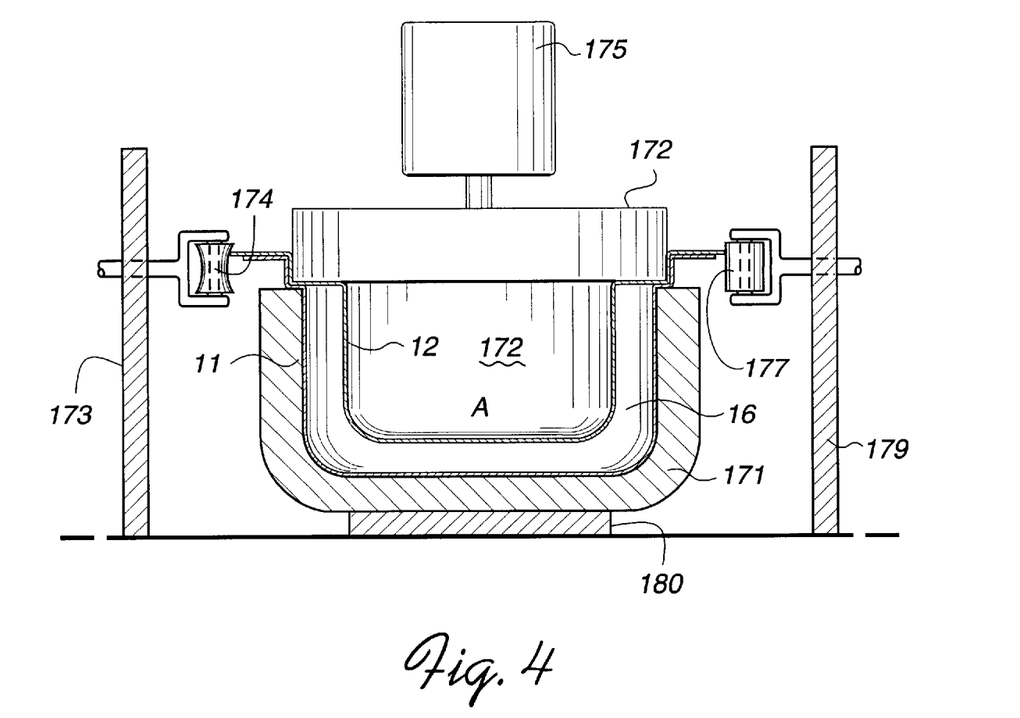
FIG. 4 illustrates a cross-sectional view of the cooking container placed in an assembly jig.

FIGS. 4 to 8 illustrate manufacturing processes for the cooking utensil according to the present invention. FIG. 4 illustrates a cross-sectional view of the cooking utensil 100 placed in an assembly jig. The assembly jig comprises a first mold 171 fixed to a turn table 180, a second mold 172 connected to a hydraulic cylinder 175. The assembly jig further comprises two vertical frames 173 and 179. The first frame 173 supports the curling roller 174, and the second frame 179 supports the flatening or beading roller 177. The curling roller 174 is preferably a cylindrical in shape with a concaved outer surface to assist the curling of the inner and the outer shells. The flatening roller 177 has a cylindrical shape to compress or flatened the curled joint.

Referring to FIG. 4, first, an inner shell 12 and an outer shell 11 which are preferably made of stainless steel having a predetermined strength are prepared so that the inner shell 12 is placed in an opening defined by the outer shell 11. A heat conduction medium 14, such as silicon oil, is then put into the outer shell 11. Then, the inner shell 12 is placed therein to fill up the space between the outer and inner shells 11 and 12 with the heat conduction medium 14 occupying up to 65% by volume of the space 16. If cooking utensil is not have have silicon oil, then the inner shell is simply placed inside the outer shell 11 for further processing.

The inner and outer shells 12 and 11, when overlapped, are constructed and designed to provide a vertical and bottom space 16 by being separated from each other at a predetermined distance. Initially, the edges or flanges of the inner and outer shells 12 and 11 are made flat and coplanarly placed for curling. To assist the downward curling of the edges, the edges of the inner shell 12 extends slight farther than that of the outer shell 11, as shown in FIG. 4. Alternatively, if the upward curling is desired, the edges of the outer shell 11 extends farther than that of the inner shell 12.

A first mold 171, preferably made of steel, is fixed to a turn table of a curling machine. The first mold 171 has a concaved groove to which the outer shell 11 is inserted to fit therein. The top flange of the first mold 171 is flat to support the ends of the flanges of the outer and inner shells 11 and 12.

Then, a second mold 172 connected to a hydraulic cylinder 175 is lowered down to be coupled with the inner shell 12 and fastened to the turn table. A convexed part A of the second mold 172, which will be inserted inside the inner shell 12, and a collar B, which abuts against the first mold 171 by pressing against the flanges of the inner and outer shells, are formed in the second mold 172. When the second mold 172 is inserted inside the inner shell 12, the separation distance between the outer and inner shells 11 and 12 becomes substantially uniform.

Figure 5:
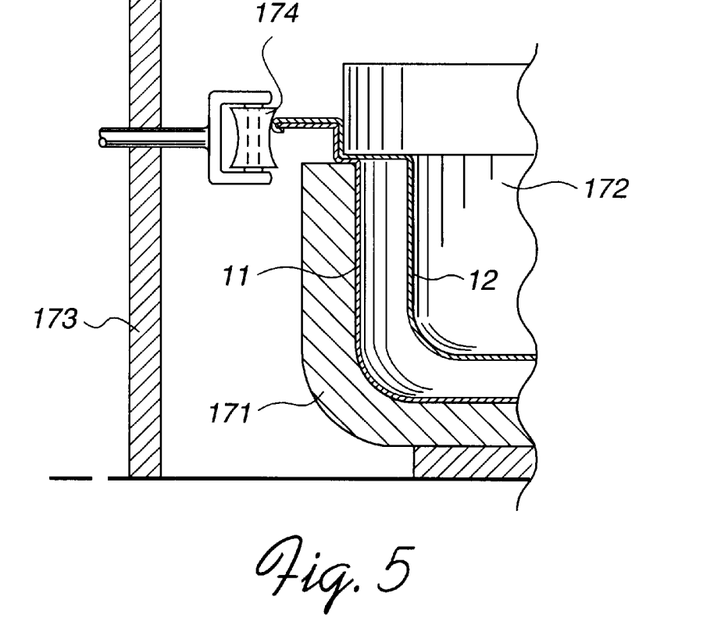
FIG. 5 illustrates manufacturing processes for the cooking container according to the present invention showing the beginning of the curling or rotation process.
Figure 6:
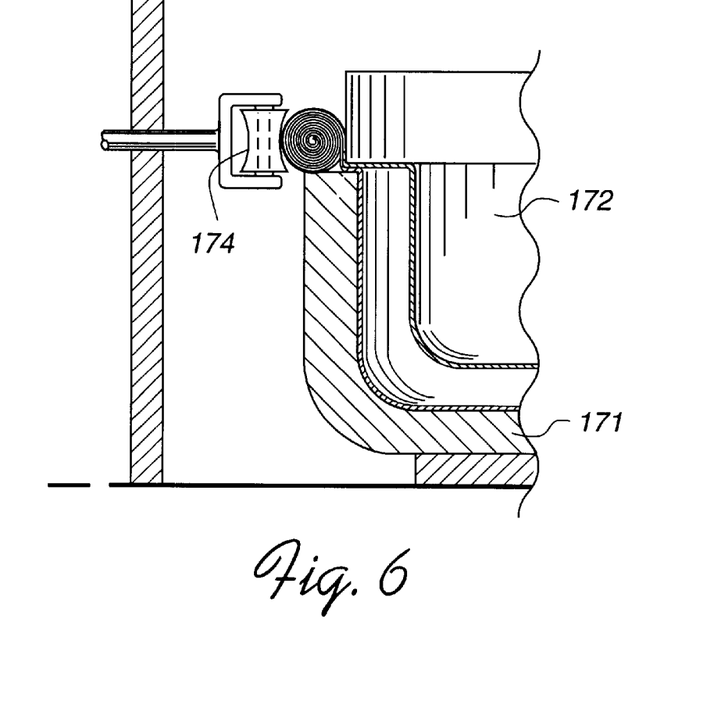
FIG. 6 illustrates the completion of the curling or rotation process.

Referring to FIGS. 5 and 6, the edges of the flanges of the outer and inner shells 11 and 12 are rolled or curled by pressing the edges with cylindrical curling rollers 174 which are coupled to the first frame 173 of the curling machine while the first and second molds 171 and 172 are rotating with the outer and inner shells 11 and 12. The flat flanges are circularly rolled over by pushing the curling roller 173 gradually toward the center.

Figure 7:
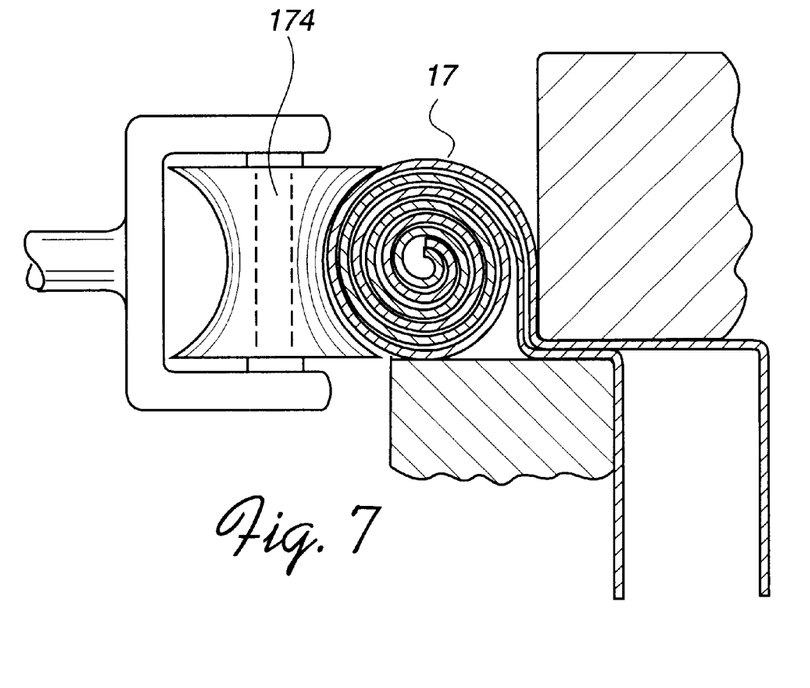
FIG. 7 illustrates an enlarged cross-sectional view of the rolled joint formed by the manufacturing process of the present invention.

The cross-section of the rolled joint 17 is substantially a circle as shown in FIG. 6. As shown in FIG. 6, the upper flanges of the outer and inner shells 11 and 12 are curled at about 360 degrees about 4 to 8 times, preferably 4 times, to form the rolled joint 17. The enlarged cross-sectional view of the rolled joint 17 is shown in FIG. 7.

Figure 8:
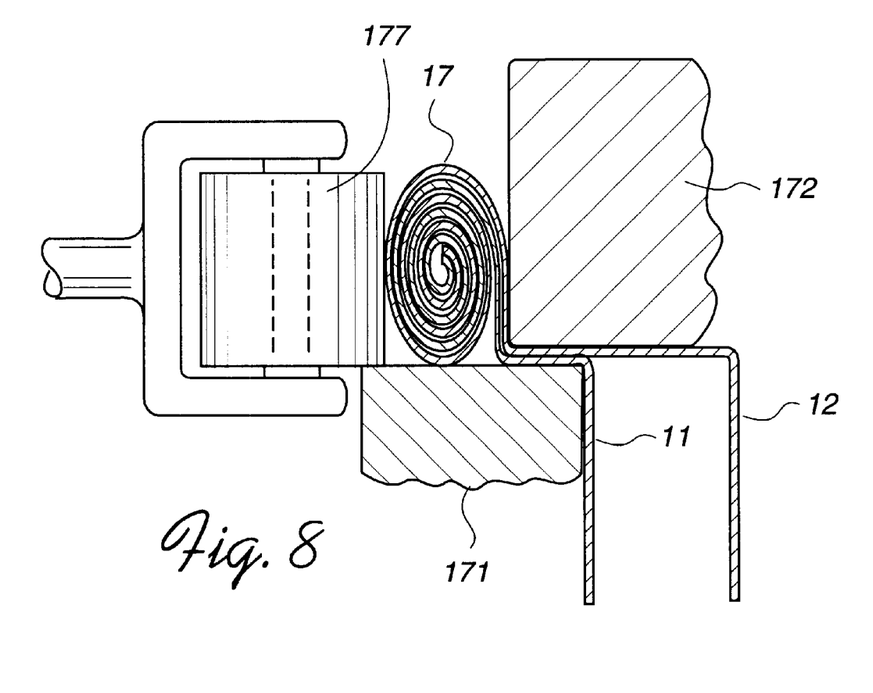
FIG. 8 illustrates the process of flatening the rolled joint against the side wall of the second mold.

FIG. 8 illustrates the process of flatening the rolled joint 17 against the side wall of the second mold 172. In particular, once the rolled joint has about 4 to 8 rotations, the flatening roller 177 connected to the second frame 179 is pressed against the side walls of the second mold 172, thereby flatening the rolled joint 17, as shown in FIG. 8. The flatened rolled joint 17 can sustain higher pressure build up in the space 16.

The advantage of using the molding apparatus described above is that it allows up-right, i.e., opening of the shells facing upward, placement of the cooking utensil, while conventional jigs all allowed upside down placement of the cooking utensil. The up-right placement of the cooking utensil allows the heat conductive medium 14, such as silicon oil, to be deposited without the use of special injection tool. This further eliminates the use of an injection valve typically formed in a side wall of the outer shell 11, which was required when the up-side down placement of cooking utensil was required.

The present invention provides for a simple and strong structure while allowing easy manufacturing steps without the use of special injection tools since the edges of the inner and outer shells 11 and 12 are sealed completely by curling after the heat conduction medium 14 is filled into the outer shell 11.

Figure 9:
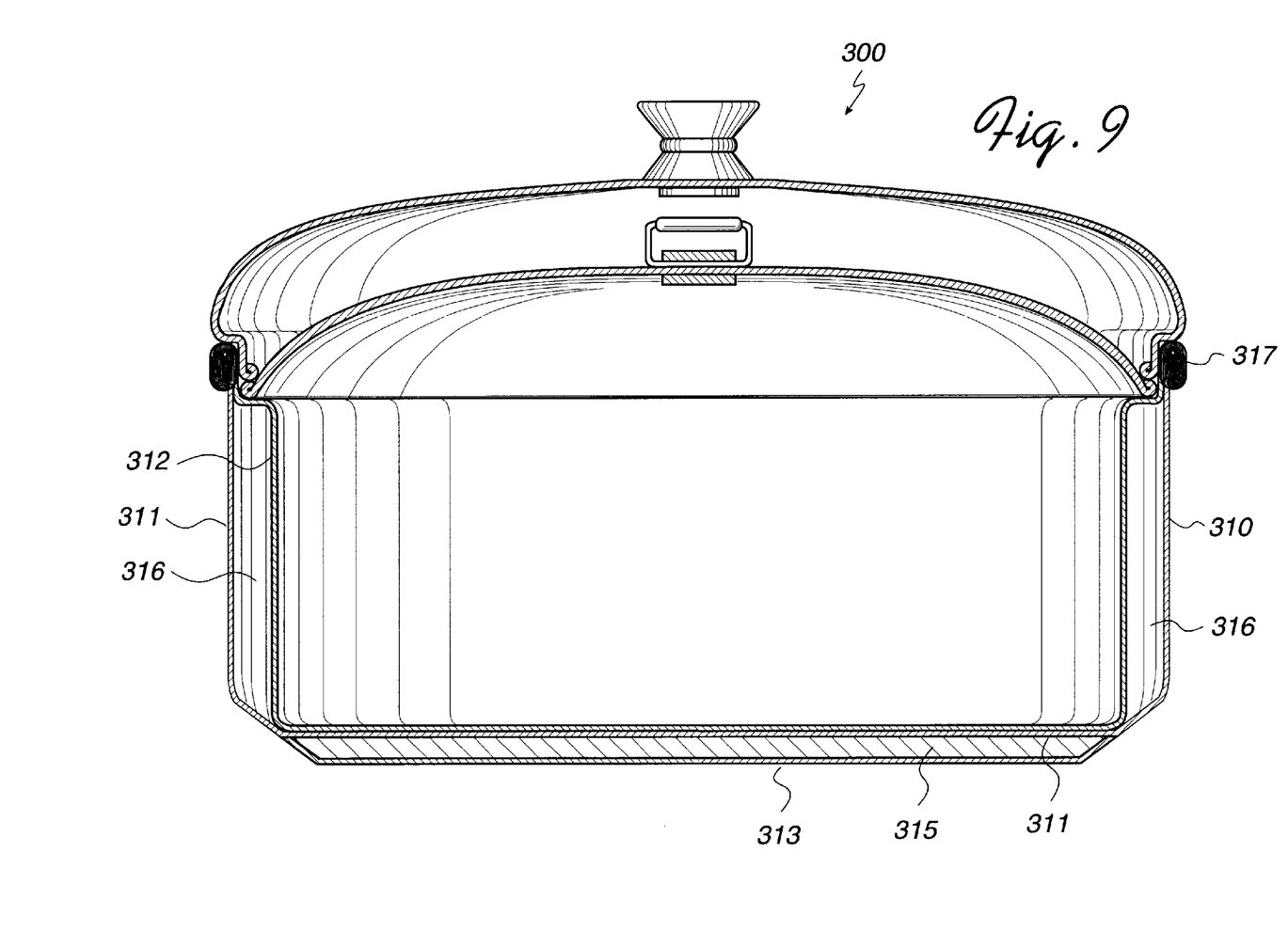
FIG. 9 illustrates the cooking utensil according to a third embodiment of the present invention.

FIG. 9 illustrates the cooking utensil according to a third embodiment of the present invention. According to the third embodiment, the container 310 of the cooking utensil includes an outer shell 311 and an inner shell 312 disposed adjacent the outer shell. Edges of the outer and inner shells 311 and 312 are preferably rolled together to form a rolled joint 317. In particular, the rolled joint 317 is formed by rotating the outer and inner shells 311 and 312 at least about four revolutions (each revolution being 360 degrees) so that there are at least 16 shell layers.

As a result, a vertical space 316 filled with an air pocket is provided between the outer and inner shells 311 and 312. The air pockets are sealed and are not in fluid communication with outside air. The vertical space 316 filled with air is preferably filled with ambient air during the manufacturing process. The structure and the materials for the third embodiment of the present invention are substantially the same as the first embodiment, and therefore, will not be repeated.

According to the third embodiment of the present invention, both the outer and inner shells 311 and 312 are jointly rolled about 4 to 8 times, and preferably 4 times, to form the rolled joint 317. The tightly rolled joint 317 prevents the air contained in the vertical space 316 from escaping even when the cooking utensil 300 is subjected to intense heat. The unique structure of the rolled joint 317 and the thickess of the walls of the outer and inner shells 311 and 312 allow the container 310 to be used without any air escape valves built into the wall to prevent the utensil against possible explosion.

Referring to FIG. 9, unlike the first and the second embodiments, there is no first heat conduction plate 14 placed between the outer and inner shells 311 and 312. Instead, the bottom surface of the inner shell 312 is preferably flushly affixed to the upper surface of the outer shell 311.

In the third embodiment, there is a heat conduction plate 315 is disposed below the bottom surface of the outer shell 311. The heat conduction plate 315 is preferably made of an aluminum disk or other suitable materials known to one of ordinary skill in the art. The heat conduction plate 315 is about 2 to 4 mm thick, and preferably about 3 mm thick. The heat conduction plate 315 is securely affixed to the bottom of the outer shell 311 by brazing or other suitable method known to one of ordinary skill in the art.

The heat conduction plate 315 is covered by a support cover 313. The support cover 313 is attached to an outer bottom surface of the outer shell 311 fully surrounding and in contact with the heat conduction plate 315. The support cover 313 is preferably made of the same material as that of the container 310 of the cooking utensil 300. In particular, the support cover 313 is made of AISI304 stainless steel that has a thickness of about 0.5 mm. In the container 310, the bottom wall of the outer shell 311, the heat conduction plate 315 and the support cover 313 are in thermal communication with each other.

Figure 10:
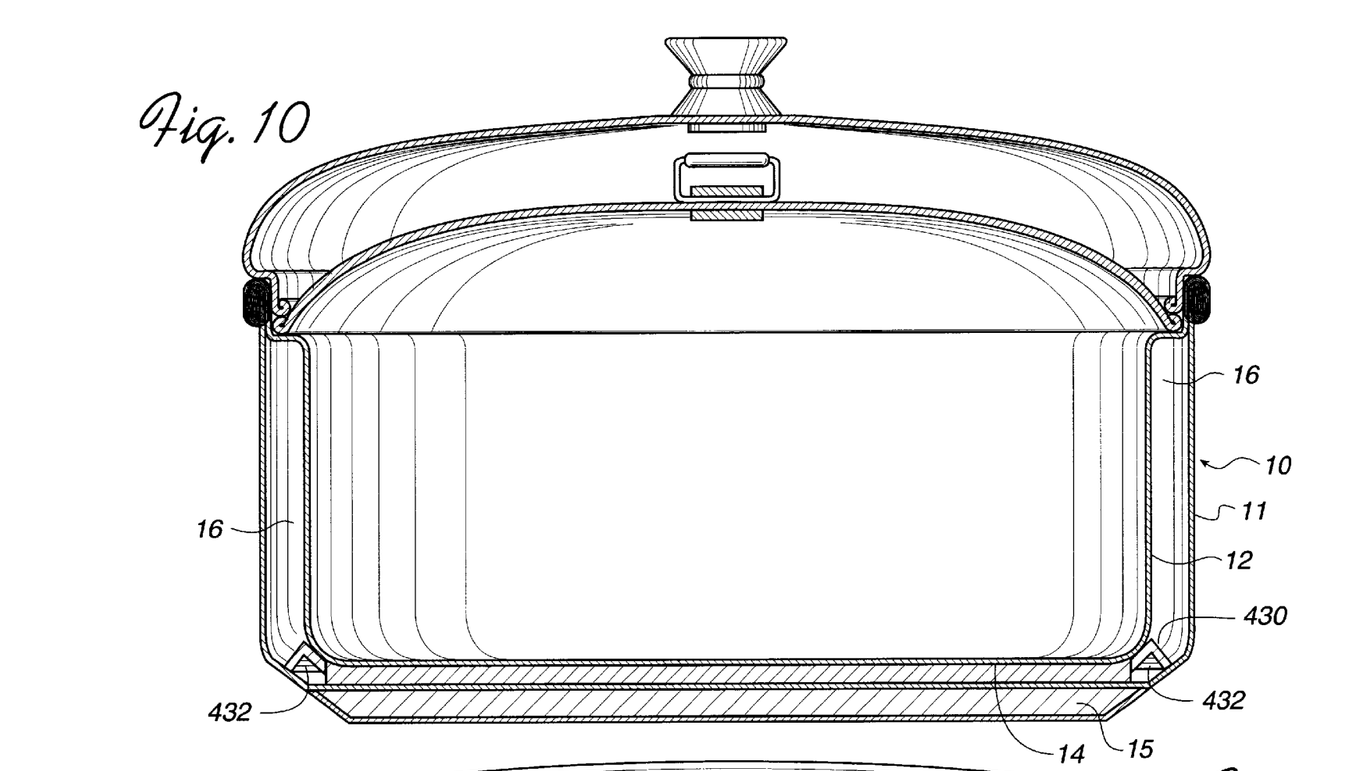
FIG. 10 illustrates the cooking utensil of the present invention being used with a first type of guard ring.
Figure 11:
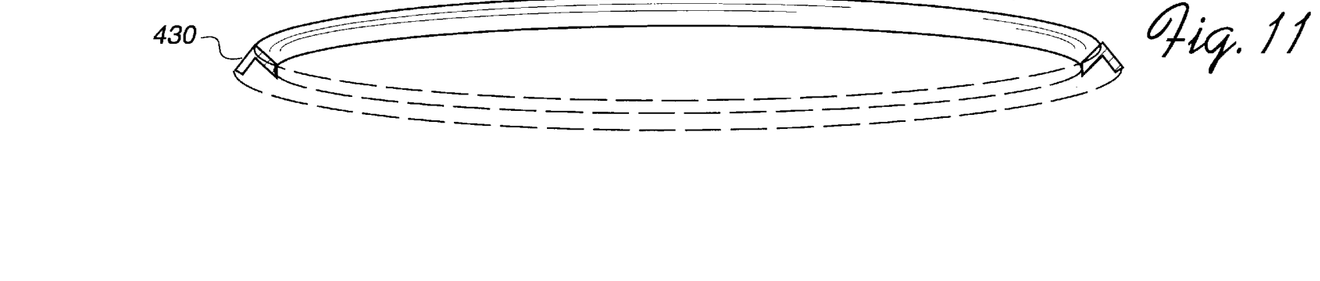
FIG. 11 illustrates the first type of guard ring used with the present invention.

FIG. 10 illustrates the cooking utensil of the present invention being used with a first type of guard ring 430. FIG. 11 illustrates the guard ring 430 used with the present invention. Referring to FIG. 10, the guard ring 430 is disposed around the first heat conduction plate 14. As shown in FIG. 11, the guard ring 430 comprises a circular ring and has an L-shaped cross-section.

When the container 10 is being manufactured using the process described above, foreign debris may be inadvertenly introduced into the space 16 formed by the inner and the outer shells 12 and 11. Such foreign debris may include aluminum chips and residues from the heat conduction plates 14 and 15. When heated, the foreign debris inside the space 16 melts or starts to bounce against the inner walls of the shells 11 and 12. As a result, such debris makes disturbing and unpleasant noise inside the container 10. To prevent such problem, the guard ring 430 is introduced to substantially trap the foreign debris in the gap 432 created by the guard ring 430 and the outer circumference of the first heat conduction plate 14.

Figures 12, 13:
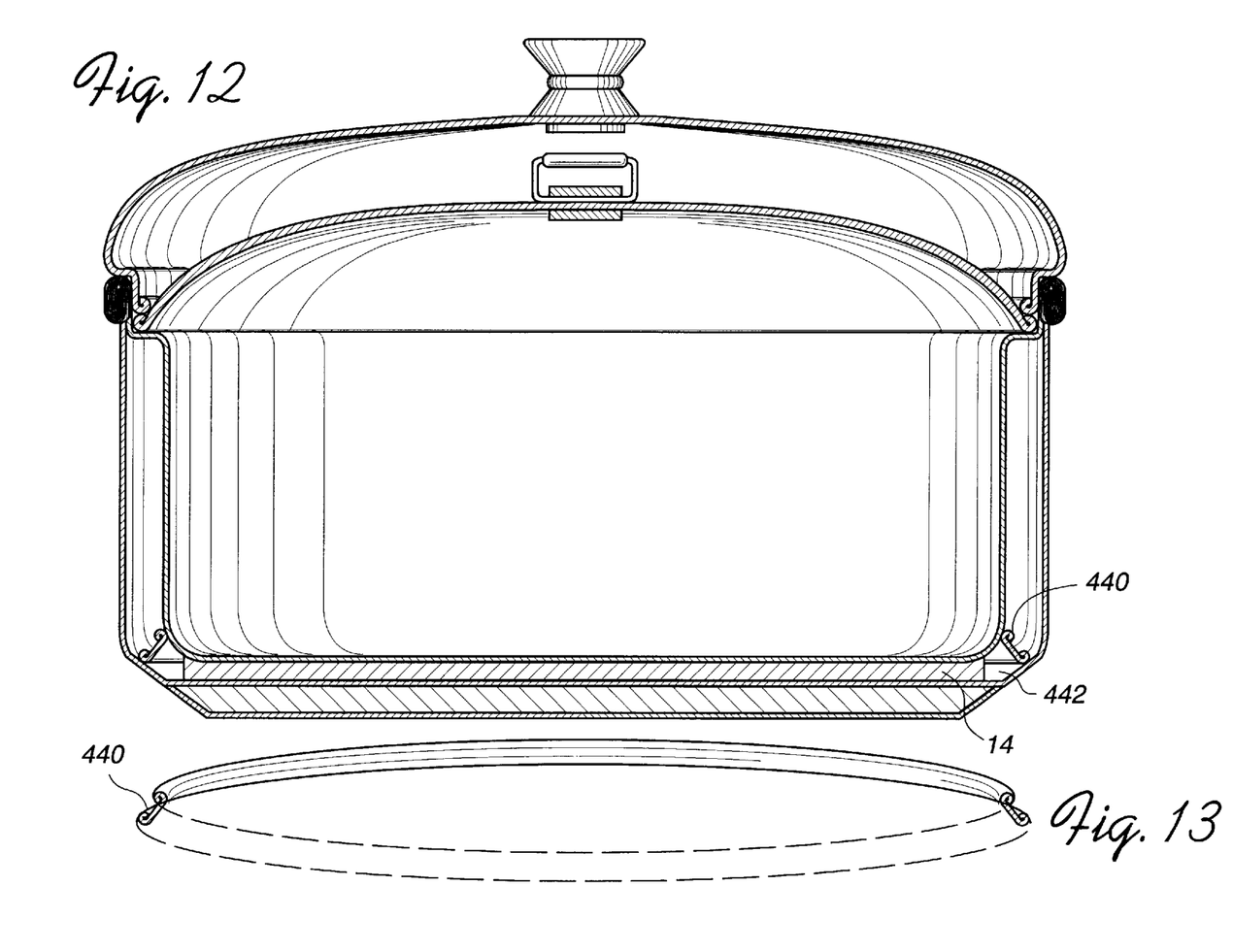
FIG. 12 illustrates the cooking utensil of the present invention being used with a second type of guard ring.
FIG. 13 illustrates the second type of guard ring used with the present invention.

FIG. 12 illustrates the cooking utensil of the present invention being used with a second type of guard ring 440. FIG. 13 illustrates the second type of guard ring 440 used with the present invention. Referring to FIG. 12, the guard ring 440 is disposed around the first heat conduction plate 14. As shown in FIG. 13, the guard ring 440 comprises a circular ring and has a U-shaped cross-section.

The second type of guard ring 440 is placed in the container 10 for the same reason described above with respect to the first guard ring 430. In particular, the guard ring 440 is introduced to substantially trap the foreign debris in the gap 442 created by the guard ring 440 and the outer circumference of the first heat conduction plate 14.

Preferably, the first and the second types of guard rings 430 and 440 are made of stainless steel or other suitable material known to one of ordinary skill in the art to sustain the heat inside the container 10. Although the guard rings 430 and 440 described above have distinct shapes, alternative shapes may also be used without deviating from the gist of the present invention.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and equivalents.

What is claimed is:

1. A cooking container comprising:
   an outer shell having an opening and a first flange;
   an inner shell having a second flange and being disposed inside the outer shell through the opening, forming a wall space between the outer and inner shells, wherein the wall space is formed substantially along the height of the inner shell and at least partially contains air; and
   a first heat conductive plate being in contact with both an inner bottom surface of the outer shell and an outer bottom surface of the inner shell to allow even distribution of heat through out the bottom surface of the inner shell, wherein the first and the second flanges of the outer and inner shells are curled at about 360 degree angle and at least four times to form a rolled joint, and wherein the rolled joint is compressed to hermetically seal the wall space.

2. The cooking container of claim 1, further comprising a second heat conduction plate affixed to and in contact with an outer bottom surface of the outer shell.

3. The cooking container of claim 2, further comprising a support cover configured to fit in surrounding relation to the second heat conduction plate.

4. The cooking container of claim 1, further comprising an inner lid that fits over the second flange of the inner shell to substantially cover an opening defined by the inner shell.

5. The cooking container of claim 4, wherein the inner lid comprises
   a disk having a diameter sufficiently large to cover the opening of the inner shell; and
   a ring coupled to the disk and circumferentially covering outer edges of the disk.

6. The cooking container of claim 1, further comprising a cover that fits over the second flange of the inner shell to substantially cover an opening defined by the inner shell.

7. The cooking container of claim 1, wherein the wall space between the outer and inner shells contains a heat conduction medium.

8. The cooking container of claim 1, wherein the heat conduction medium is silicon oil.

9. The cooking container of claim 8, further comprising a second heat conduction plate afixed to and in contact with an outer bottom surface of the outer shell.

10. The cooking container of claim 9, further comprising a support cover configured to fit in surrounding relation to the second heat conduction plate.

11. The cooking container of claim 8, wherein the amount of silicon oil stored in the wall space defined by the outer and inner shells is approximately 55 to 75% by volume.

12. The cooking container of claim 8, wherein the amount of silicon oil stored in the wall space defined by the outer and inner shells is approximately 65% by volume.

13. The cooking container of claim 1, further comprising a guard ring disposed in a lower proximity of the wall space around a circumference of the first heat conduction plate.

14. The cooking container of claim 13, wherein the guard ring has an L-shaped cross section.

15. The cooking container of claim 13, wherein the guard ring has a U-shaped cross section.

16. A cooking container comprising:
   an outer shell having an opening and a first flange;
   an inner shell having a second flange and being disposed inside the outer shell through the opening, forming a wall space between the outer and inner shells, wherein the wall space is formed substantially along the height of the inner shell and at least partially contains air, wherein an inner bottom surface of the outer shell and an outer bottom surface of the inner shell are affixed to each other to allow even distribution of heat through out the bottom surface of the inner shell; and
   a heat conduction plate affixed to and in contact with an outer bottom surface of the outer shell, wherein the first and the second flanges of the outer and inner shells are curled at about 360 degree angle and at least four times to form a rolled joint, and wherein the rolled joint is compressed to hermetically seal the wall space.

17. A cooking container comprising:

an outer shell having an opening and a first flange;

an inner shell having a second flange and being disposed inside the outer shell through the opening, forming a wall space between the outer and inner shells, wherein the wall space is formed substantially along the height of the inner shell and at least partially contains air;

a first heat conductive plate being in contact with both an inner bottom surface of the outer shell and an outer bottom surface of the inner shell to allow even distribution of heat through out the bottom surface of the inner shell, wherein the first and the second flanges of the outer and inner shells are curled at about 360 degree angle and at least four times to form a rolled joint to hermetically seal the wall space; and a guard ring disposed in a lower proximity of the wall space around a circumference of the first heat conduction plate, wherein the guard ring has an L-shaped cross section.

18. A cooking container comprising:

an outer shell having an opening and a first flange;

an inner shell having a second flange and being disposed inside the outer shell through the opening, forming a wall space between the outer and inner shells, wherein the wall space is formed substantially along the height of the inner shell and at least partially contains air;

a first heat conductive plate being in contact with both an inner bottom surface of the outer shell and an outer bottom surface of the inner shell to allow even distribution of heat through out the bottom surface of the inner shell, wherein the first and the second flanges of the outer and inner shells are curled at about 360 degree angle and at least four times to form a rolled joint to hermetically seal the wall space; and a guard ring disposed in a lower proximity of the wall space around a circumference of the first heat conduction plate, wherein the guard ring has a U-shaped cross section.

* * * * *